July 18, 1961    L. G. FREEMAN    2,992,871
ADJUSTABLE FOLDING TABLE
Filed April 20, 1959
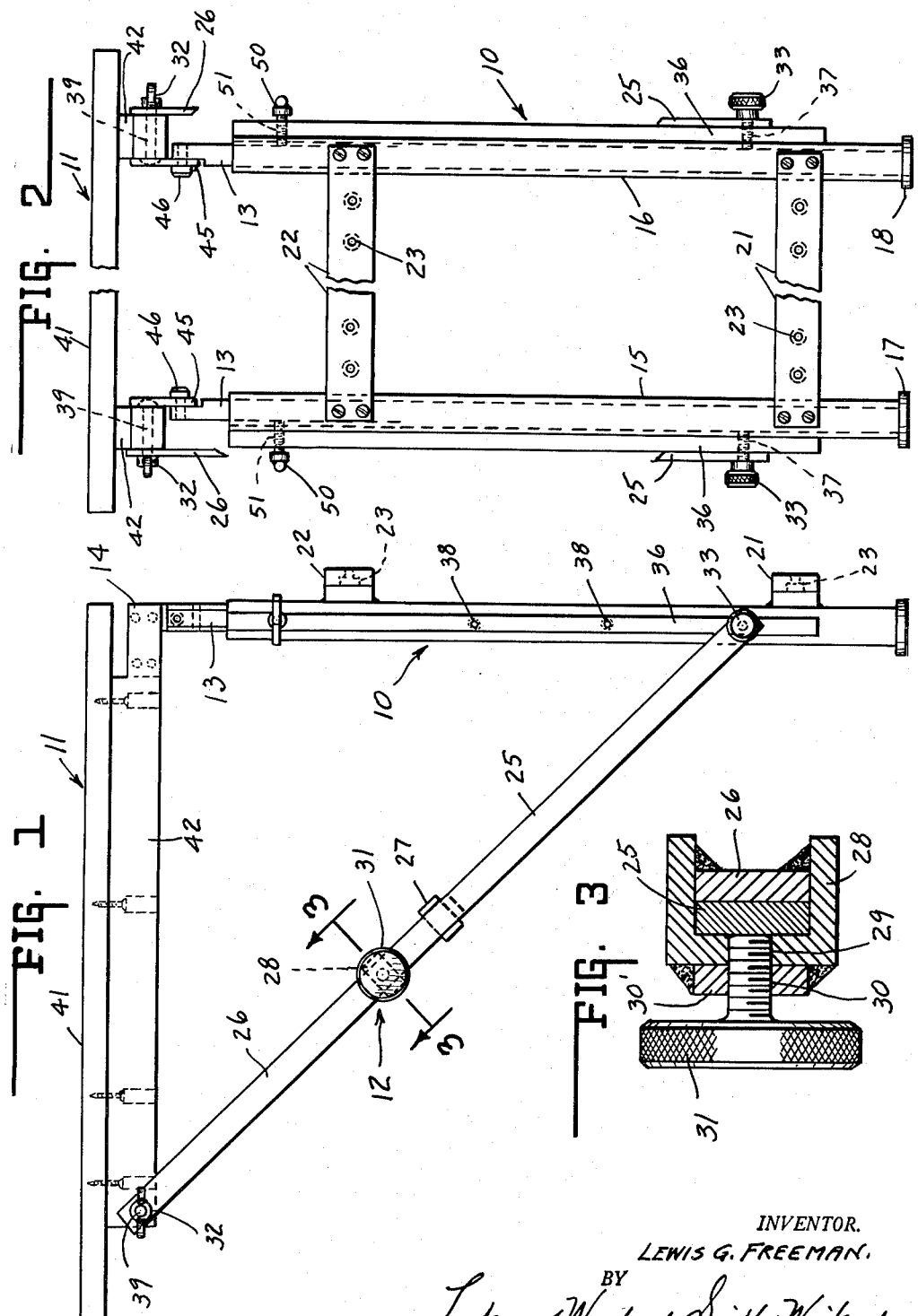
INVENTOR.
LEWIS G. FREEMAN.
BY
Lockwood, Woodard, Smith & Weikart,
ATTORNEYS.

United States Patent Office 2,992,871
Patented July 18, 1961

2,992,871
ADJUSTABLE FOLDING TABLE
Lewis G. Freeman, R.R. 3, Kokomo, Ind.
Filed Apr. 20, 1959, Ser. No. 807,403
1 Claim. (Cl. 311—20)

The present invention relates to an adjustable folding table.

It is an object of the present invention to provide an improved adjustable folding table.

It is a further object of the present invention to provide a table which is adjustable as to height and attitude or angle of inclination and which is arranged so as to be swingable into a vertical, space-saving position.

Still another object of the present invention is to provide a table having great flexibility of adjustment.

Further objects will become apparent as the description proceeds.

The full nature of the invention will be understood from the accompanying drawings and the following description and claim.

FIG. 1 is a side elevation of a table embodying the present invention.

FIG. 2 is a rear elevation of the table illustrated in FIG. 1 with certain portions thereof broken away.

FIG. 3 is an enlarged section taken in the direction of the arrows and along the line 3—3 of FIG. 1.

Referring now to the drawings, my invention comprises, in general, an upright frame 10, a pair of supports 13—13 mounted upon the frame 10 and vertically adjustable with respect thereto, a table 11 pivotally mounted at one edge 14 upon the supports 13, and a pair of elongated braces 12—12 supporting the table from the frame 10. The height and angle or attitude of the table may be adjusted by changing the length of the braces 12, by changing the location of attachment of the frame-end of the braces 12 and by adjusting the position of the supports 13 with respect to the frame 10. The table 11 may be let down so as to save space by removing the braces 12 and by swinging the table downwardly, it being understood that the table is pivotally secured to the supports 13.

The frame 10 comprises a pair of upright tubular members 15 and 16 which are provided respectively with rubber feet 17 and 18. The tubular members 15 and 16 are fixed in a spaced parallel relationship by means of horizontal cross braces 21 and 22, each of which has a plurality of apertures 23—23 suitable for use in attaching the device to a wall, to a desk, back-to-back with another such device, or to any other support.

Each brace 12 comprises a pair of bars 25 and 26 having fixed thereto, respectively, U-shaped guides 27 and 28, the guides being so mounted upon the bars that each bar with its respective guide forms a cavity for the reception of the other bar. See FIG. 3 which shows this relationship for a representative one of the guides. It can readily be seen that the bars 25 and 26 will be maintained in a desired parallel relationship by the guides 27 and 28.

A screw 31, having a knurled head for easy gripping and rotating thereof, is received within a threaded bore 29 in the guide 28 and within a threaded bore 30 in a member 30' fixed to guide 28 for providing additional bearing surface for the screw 31. The length of the brace 12 may be adjusted by rotating screw 31 so as to release its pressure against bar 25, by setting the two bars at such a position as to provide the desired length of the brace 12, and by tightening the screw 31 so that the bar 25 is gripped between screw 31 and the bar 26.

The two braces 12 are attached to the frame 10 by means of knurled headed screws 33—33 which are threadedly received in threaded apertures 37—37 in mount members 36—36 each of which is fixed to a side of a respective one of the upright tubular members 15 and 16. As shown in the drawings, a plurality of threaded apertures 38—38 are provided all along the mount members 36 to make possible relocation of the frame end of the braces 12, the apertures 38 being threaded and of the same size as the apertures 37 for reception of the screws 33. The fact that the length of the braces 12 may be varied and the fact that the frame end of the braces 12 may be attached anywhere upwardly or downwardly along the upright tubular members 15 provides a flexibility not present in prior art structures. For example, the braces 12 may be shortened and attached to the frame in upward positions to save space below the table or may be lengthened and attached to the frame in downward positions as in FIG. 1 to more strongly support the table.

The table 11 comprises an upper flat rectangular portion 41 and a pair of mount members 42 each of which has at one end a horizontally projecting, screw-threaded member 39 upon which a respective one of the braces 12 is received. A pair of wing nuts 32—32 are used to fix the braces 12 to the mount members 42. At the other end of the mount members 42 there is fixed a pair of arms 45 which project downwardly and are pivotally received upon respective ones of pins 46—46 fixed to the upper ends of the supports 13. Thus, it can be seen by removing the wing nuts 32 and the knurled headed screws 33 that the braces 12 may be removed from the device and the table may be let down so as to hang in parallel space-saving relationship adjacent the upright frame 10. It should be noted that the arm 45 is of such length that each mount member 42 is sufficiently spaced from its support 13 so as to make possible easy pivoting of the table with respect to the support members 13.

Each of the support members 13 has a generally cylindrical shape and is received within a respective one of tubular members 15 and 16 in such a manner as to be vertically movable in the tubular member. A pair of thumbscrews 50—50 (screws having radially arranged bars fixed to their heads to increase leverage) are threadedly received within threaded apertures 51—51 in mount members 36, extend through the walls of the tubular members 15 and 16 and are used to fix the supports 13 in any desired vertical position with respect to the tubular members 15 and 16.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claim.

The invention claimed is:

An adjustable folding table comprising a pair of parallel upright tubular members, a pair of horizontal bracing elements fixing said tubular members in spaced parallel relationship and having a plurality of apertures for mounting the folding table, a pair of elongated generally cylindrical supports, each of said supports received for vertical movement within one of said tubular members, a pair of thumbscrews each passing through the wall of one of said tubular members for fixing the position of each support with respect to its respective tubular member, a flat rectangular table, each of said supports having an upper end pivotally connected to one edge of said table, the two support-table connections being adjacent to two adjacent corners of said table, a pair of elongated braces, each brace comprising a pair of smooth bars, a U-shaped guide member fixed to each of said bars for maintaining said bars in a parallel relationship, each of said U-shaped members secured by its legs to a respective one of said bars and defining with said respective bar an aperture which slidably receives the other bar, a knurl headed screw threaded into the base of one U-shaped member of each brace and engaging the bar slidably received by said last mentioned U-shaped member for fixing the bars of each brace against movement with respect to one another, each brace being detachably securable at one end to one of said tubular members at any of a plurality of vertically spaced points and detachably securable at the other end to said table adjacent a table corner in such a manner that each brace forms, with a respective tubular member, support and with said table, a vertical triangular shape, the two thus formed triangular shapes being parallel to one another, a pair of mounting members for said braces fixed to said tubular members and each having threaded apertures at each of said vertically spaced points, and knurl headed screws extending through the one end of each brace for threading into said last mentioned apertures.

References Cited in the file of this patent

UNITED STATES PATENTS

| | | |
|---|---|---|
| 590,872 | Allen | Sept. 28, 1897 |
| 826,805 | Scheibner | July 24, 1906 |
| 921,468 | Scheibner | May 11, 1909 |
| 1,232,874 | Whealen | July 10, 1917 |
| 1,262,468 | Drapalik | Apr. 9, 1918 |
| 1,624,862 | Elliot | Apr. 12, 1927 |
| 1,700,545 | Sanders | Jan. 29, 1929 |
| 2,352,837 | Hillenbrand | July 4, 1944 |
| 2,666,679 | Olofsson | Jan. 19, 1954 |
| 2,881,039 | Guzman | Apr. 7, 1959 |